US010011216B1

(12) United States Patent
Rovik (10) Patent No.: US 10,011,216 B1
(45) Date of Patent: Jul. 3, 2018

(54) AUTO TURN SIGNAL INITIATION BASED ON LANE CHANGE AND DRIVER HISTORY

(71) Applicant: Toyota Motor Engineering & Manufacturing North America, Inc., Erlanger, KY (US)

(72) Inventor: Christopher L. Rovik, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/499,438

(22) Filed: Apr. 27, 2017

(51) Int. Cl.
| | | |
|---|---|---|
| B60Q 1/34 | (2006.01) | |
| G06K 9/00 | (2006.01) | |
| H04N 5/33 | (2006.01) | |
| G06K 9/20 | (2006.01) | |
| H04N 5/225 | (2006.01) | |

(Continued)

(52) U.S. Cl.
CPC ......... B60Q 1/346 (2013.01); G06K 9/00798 (2013.01); G06K 9/00845 (2013.01); G06K 9/2018 (2013.01); G06K 9/2027 (2013.01); H04N 5/2256 (2013.01); H04N 5/33 (2013.01); B60Q 2300/122 (2013.01); B60Q 2300/142 (2013.01); B60R 1/00 (2013.01); B60R 2300/804 (2013.01); B60R 2300/8006 (2013.01); G01S 19/13 (2013.01)

(58) Field of Classification Search
CPC .............. B60K 1/346; G06K 9/00798; G06K 9/00845; G06K 9/2018; G06K 9/2027; H04W 5/2256; H04W 5/33

USPC .......................................................... 340/465
See application file for complete search history.

(56) References Cited

U.S. PATENT DOCUMENTS 6,876,300 B2 * 4/2005 Ponziani ................ B60Q 1/346
162/36
7,843,360 B2 11/2010 Ponziani
(Continued)

FOREIGN PATENT DOCUMENTS

KR 2013105116 A 9/2013

OTHER PUBLICATIONS

Cate Lawrence, "Could this be the first smart car for quadriplegics?", http://readwrite.com/2016/08/02/could-this-e-the-first-smart-car-for-quadriplegics-tt1/, Aug. 2, 2016.

Primary Examiner — Omar Casillashernandez
Assistant Examiner — Omar Casillas
(74) Attorney, Agent, or Firm — Dinsmore & Shohl LLP (57) ABSTRACT

An auto turn signal system for activating a turn signal of a vehicle includes an electronic control unit, a processor, a non-transitory computer readable memory, a camera and a machine-readable instruction set. The camera automatically captures image data and transmits the image data to the electronic control unit. The machine-readable instruction set causes the processor to receive the image data from the camera, determine at least one of a driver head movement and a driver eye movement based on the image data, predict a change in a lane of travel from a current lane of travel to a predicted destination lane of travel, detect initiation of the change from the current lane of travel to the predicted destination lane of travel, and automatically activate the turn signal in response to detecting the initiation of the change from the current lane of travel to the predicted destination lane of travel.

17 Claims, 6 Drawing Sheets

(51) Int. Cl.
   *G01S 19/13*     (2010.01)
   *B60R 1/00*      (2006.01)

(56)          References Cited

U.S. PATENT DOCUMENTS

| | | | |
|---|---|---|---|
| 7,889,065 B2 | 2/2011 | Smith | |
| 8,498,778 B2 | 7/2013 | Seymour et al. | |
| 8,648,535 B2 | 2/2014 | Tatara | |
| 9,457,709 B2 | 10/2016 | Alataas | |
| 9,517,719 B2 | 12/2016 | Lueke et al. | |
| 9,616,809 B1* | 4/2017 | Alasry | B60Q 1/346 |
| 9,760,702 B1* | 9/2017 | Kursun | G06F 21/32 |
| 2005/0200467 A1* | 9/2005 | Au | B60Q 1/34 340/465 |
| 2009/0174540 A1* | 7/2009 | Smith | B60Q 1/34 340/465 |
| 2011/0106376 A1 | 5/2011 | Tijerina et al. | |
| 2011/0199200 A1* | 8/2011 | Lueke | B60Q 1/346 340/435 |
| 2016/0046298 A1* | 2/2016 | Deruyck | B60W 40/09 340/576 |
| 2016/0052391 A1* | 2/2016 | Walsh | B60K 28/066 340/575 |
| 2016/0325682 A1* | 11/2016 | Gupta | B60R 1/00 |

\* cited by examiner

AUTO TURN SIGNAL INITIATION BASED ON LANE CHANGE AND DRIVER HISTORY

TECHNICAL FIELD

The present specification generally relates to automatic turn signal initiation systems and methods and, more specifically, automatic turn signal initiation systems and methods for automatically activating a turn signal in response to detecting the initiation of the change from the current lane of travel to the predicted lane of travel.

BACKGROUND

A vehicle turn signal facilitate communication feature between drivers of vehicles on the road. The vehicle turn signal provides other drivers with notice that the signaling vehicle is planning to or currently is preforming a lane change or turning maneuver. The signaling allows nearby drivers the ability to better anticipate and identify imminent or ongoing maneuvers by the signaling vehicle. Unfortunately, turn signals are one of the most underutilized devices on a car often because drivers forget to activate the vehicle turn signal when planning or making a maneuver such as a lane change or a turn.

Accordingly, a need exists for improved systems and methods for automatically activating a vehicle turn signal.

SUMMARY

In one embodiment, an auto turn signal system for activating a turn signal of a vehicle includes an electronic control unit, a processor, a non-transitory computer readable memory, a camera, and a machine-readable instruction set. The electronic control unit includes the processor and the non-transitory computer readable memory. The camera is communicatively coupled to the electronic control unit. The camera automatically captures image data and transmits the image data to the electronic control unit. The machine-readable instruction set is stored in the non-transitory computer readable memory and causes the auto turn signal system to receive the image data from the camera, determine at least one of a driver head movement and a driver eye movement based on the image data, predict a change in a lane of travel from a current lane of travel to a predicted destination lane of travel based on the at least one of the driver head movement and the driver eye movement, detect initiation of the change from the current lane of travel to the predicted destination lane of travel, and automatically activate the turn signal in response to detecting the initiation of the change from the current lane of travel to the predicted destination lane of travel.

In another embodiment, an auto turn signal system for activating a turn signal of a vehicle includes an electronic control unit, a processor, a non-transitory computer readable memory, a camera, and a machine-readable instruction set. The electronic control unit includes the processor and the non-transitory computer readable memory. The camera is communicatively coupled to the electronic control unit. The camera automatically captures image data and transmits the image data to the electronic control unit. The machine-readable instruction set is stored in the non-transitory computer readable memory and causes the auto turn signal system to receive the image data from the camera, identify a driver of the vehicle, determine one or more driver actions based on the image data, compare the one or more driver actions with one or more elements of a driver profile corresponding to an identity of the driver of the vehicle, predict a change in a lane of travel from a current lane of travel to a predicted destination lane of travel based on the comparison of the one or more driver actions with the one or more elements of the driver profile, detect initiation of the change from the current lane of travel to the predicted destination lane of travel, and automatically activate the turn signal in response to detecting the initiation of the change from the current lane of travel to the predicted destination lane of travel.

In yet another embodiment, a method for automatically activing a turn signal of a vehicle includes receiving image data from a camera, determining at least one of a driver head movement and a driver eye movement based on the image data, predicting a change in a lane of travel from a current lane of travel to a predicted destination lane of travel based on the at least one of the driver head movement and the driver eye movement, detecting initiation of the change from the current lane of travel to the predicted destination lane of travel, and activating the turn signal in response to detecting the initiation of the change from the current lane of travel to the predicted destination lane of travel is detected.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
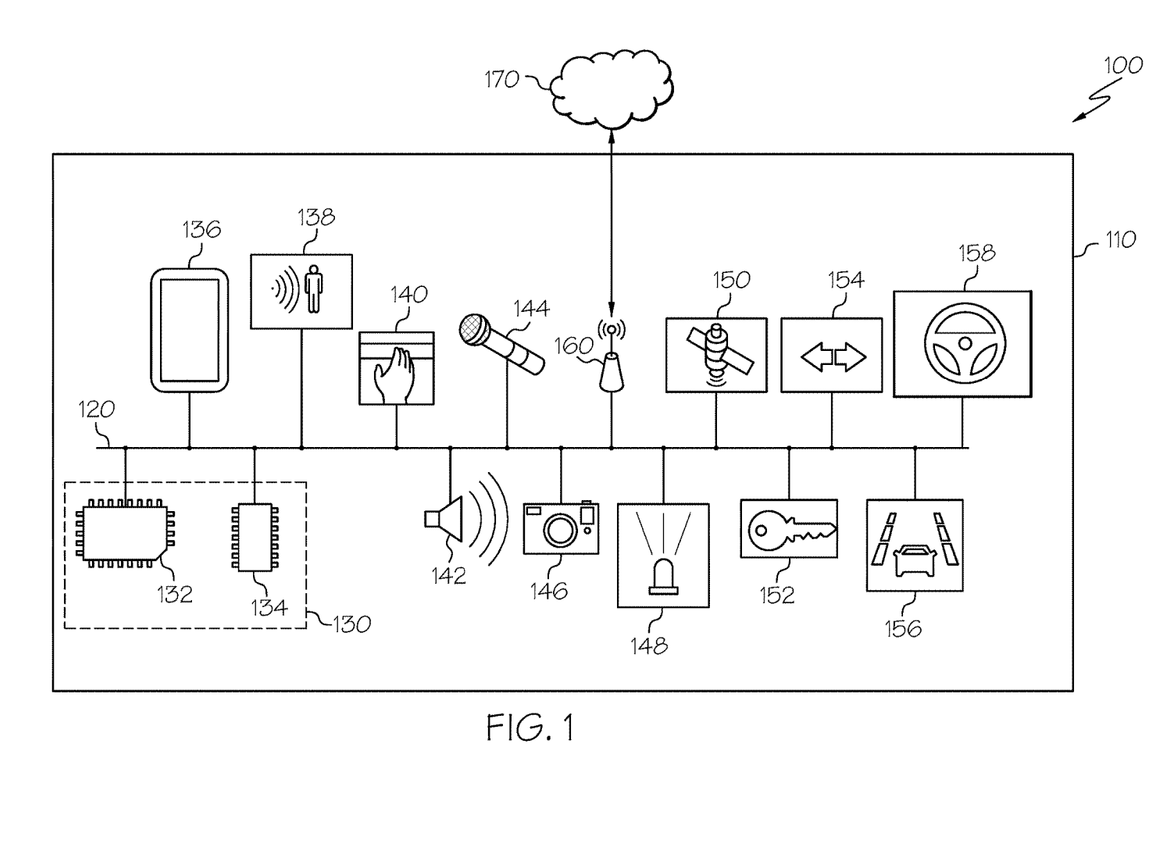
FIG. 1 schematically depicts components of an automatic turn signal initiation system according to one or more embodiments shown and described herein.

Turning now to the drawings wherein like numbers refer to like structures, and particularly to FIG. 1, an automatic turn signal initiation system 100 is depicted. The automatic turn signal initiation system 100 of a vehicle 110 generally includes, a communication path 120, an electronic control unit 130 comprising a processor 132 and a non-transitory computer readable memory 134, a display 136, an occupant sensor 138, an input device 140, a speaker 142, a microphone 144, one or more cameras 146, an infrared light emitter 148, a global positioning system 150, an ignition sensor system 152, a turn signal system 154, a lane departure system 156, a steering wheel grip sensor system 158 and network interface hardware 160. The vehicle 110 is communicatively coupled to a network 170 by way of the network interface hardware 160. The components of the automatic turn signal initiation system 100 may be contained within or mounted to a vehicle 110. The various components of the automatic turn signal initiation system 100 and the interaction thereof will be described in detail below.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the automatic turn signal initiation system 100. As used herein, the term "communicatively coupled" means that coupled components are capable of exchanging signals with one another such as, for example, electrical signals via conductive medium, electromagnetic signals via air, optical signals via optical waveguides, and the like.

Still referring to FIG. 1, the electronic control unit 130 may be any device or combination of components comprising a processor 132 and non-transitory computer readable memory 134. The processor 132 of the automatic turn signal initiation system 100 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the automatic turn signal initiation system 100 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 1 includes a single processor 132, other embodiments may include more than one processor 132.

The non-transitory computer readable memory 134 of the automatic turn signal initiation system 100 is coupled to the communication path 120 and communicatively coupled to the processor 132. The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single non-transitory computer readable memory 134, other embodiments may include more than one memory module.

The automatic turn signal initiation system 100 comprises a display 136 for providing visual output such as, for example, indication of a turn signal, a message to the driver indicating the turn signal is active, or a combination thereof. The display 136 is coupled to the communication path 120. Accordingly, the communication path 120 communicatively couples the display 136 to other modules of the automatic turn signal initiation system 100. The display 136 may include any medium capable of transmitting an optical output such as, for example, a cathode ray tube, light emitting diodes, a liquid crystal display, a plasma display, or the like. Moreover, the display 136 may be a touchscreen that, in addition to providing optical information, detects the presence and location of a tactile input upon a surface of or adjacent to the display 136. Accordingly, each display 136 may receive mechanical input directly upon the optical output provided by the display 136. Furthermore, the display may be integrated into the dash of a vehicle 110 and capable of displaying multiple status indicators of the vehicle 110. Additionally, it is noted that the display 136 can include one or more processors and one or more non-transitory computer readable memories. While the automatic turn signal initiation system 100 includes a display 136 in the embodiment depicted in FIG. 1, the automatic turn signal initiation system 100 may not include a display 136 in other embodiments.

Still referring to FIG. 1, an occupant sensor 138 may be any device or combination of components capable of outputting an occupant sensor signal indicative of the presence or absence of an occupant and optionally the position of the occupant in the vehicle 110. The occupant sensor 138 may comprise a single pressure sensor provided on each vehicle seat. The occupant sensor 138 may also comprise an array of sensors including, but not limited to, a camera, a motion sensor, a strain gauge, a pressure sensor, a microphone, a heat sensor, a contact sensor and seat belt restraint sensor to determine the presence or absence of an unattended occupant. The occupant sensor 138 may comprise one or more sensor signals when provided to the electronic control unit 130 to determine the presence or absence of an occupant and optionally the position of the occupant. The occupant sensor 138 is communicatively coupled to the electronic control unit 130 providing at least one occupant sensor signal for determining the presence or absence of an occupant in the vehicle 110.

Still referring to FIG. 1, the input device 140 is coupled to the communication path 120 and communicatively coupled to the processor 132. The input device 140 may be any device capable of transforming user contact into a data signal that can be transmitted over the communication path 120 such as, for example, a button, a lever, a switch, a knob, a touch sensitive interface, a microphone or the like. In some embodiments, the input device 140 includes a lever for activating the turn signal, a power button, a volume button, an activation button, a scroll button, or the like. In some embodiments, the input device 140 includes a pressure sensor, a touch-sensitive region, a pressure strip, or the like. It should be understood that some embodiments may not include the input device 140 or may include more than one input device 140.

The speaker 142 (i.e., an audio output device) is coupled to the communication path 120 and communicatively coupled to the processor 132. The speaker 142 transforms audio message data from the processor 132 of the electronic control unit 130 into mechanical vibrations producing sound. For example, the speaker 142 may provide to the driver a notification that the turn signal system 154 was automatically activated by the automatic turn signal initiation system 100. The audio message may act as a reminder for the driver to remember to manually activate the turn signal system 154 in the future. However, it should be understood that, in other embodiments, the automatic turn signal initiation system 100 may not include the speaker 142.

The microphone 144 is coupled to the communication path 120 and communicatively coupled to the processor 132. The microphone 144 may be any device capable of transforming a mechanical vibration associated with sound into an electrical signal indicative of the sound. The microphone 144 may be used to monitor sound levels, such as the existence of a conversation within the vehicle 110 or whether the stereo is active and at what level. The microphone 144 may be implemented, as described in more detail herein, to build a driver profile for improving the prediction of when to activate a turn signal. Furthermore, the microphone 144 may be an input device 140 to capture verbal commands. It should be understood that some embodiments may not include the microphone 144.

Still referring to FIG. 1, the one or more cameras 146 are coupled to the communication path 120 and communicatively coupled to the processor 132. The one or more cameras 146 may be any device having an array of sensing devices (e.g., pixels) capable of detecting radiation in an ultraviolet wavelength band, a visible light wavelength band, or an infrared wavelength band. The one or more cameras 146 may have any resolution. The one or more cameras 146 may be an omni-directional camera, or a panoramic camera. In some embodiments, one or more optical components, such as a mirror, fish-eye lens, or any other type of lens may be optically coupled to each of the one or more cameras 146. In embodiments described herein, the one or more cameras 146 may provide image data to the electronic control unit 130 from various viewpoints within and around the vehicle 110. For example, one or more cameras 146 may be positioned on the vehicle 110 to capture images of the surroundings of the vehicle 110 during operation.

In some embodiments, for example, the one or more cameras 146 may be position facing the driver of the vehicle 110 to capture head or eye movement of the driver. In further embodiments, one or more cameras 146 may be positioned facing the driver of the vehicle 110 to capture one of several driver actions including but not limited to eye movement, head movement, shoulder movement, torso movement, change in grip on a steering wheel, or the like. Additionally, one or more cameras 146 may capture portions of the vehicle cabin to determine the number of occupants and occupant actions, for example, without limitation, the detection of a child in the vehicle 110.

In some embodiments, an infrared light emitter 148 is coupled to the communication path 120 and communicatively coupled to the processor 132. Infrared light, also known as infrared radiation is a type of electromagnetic (EM) radiation like visible light, but infrared light is generally invisible to the human eye. EM radiation is transmitted in waves or particles across a range of wavelengths and frequencies. Infrared light waves are longer than those of visible light, just beyond the red end of the visible spectrum. An infrared light emitter 148 emits infrared light in the range of the (EM) spectrum between microwaves and visible light. Infrared light has frequencies from about 300 GHz up to about 400 THz and wavelengths of about 1 millimeter to 740 nanometers, although these values are not absolute. The spectrum of infrared light can be described in sub-divisions based on wavelength and frequency. For example, near-infrared may have a frequency of about 214 THz to about 400 THz and a wavelength to about 1400 nanometers of about 740 nanometers and far-infrared may have a frequency of about 300 GHz to about 20 THz and a wavelength of about 1 millimeter to about 15 micrometers. Infrared light may be subdivided into further divisions.

In some embodiments, the infrared light emitter 148 may be used to track eye movement. For example, without limitation, near-infrared light produced by an infrared light emitter 148 along with one or more cameras 146 can track eye movement. In operation, near-infrared light is directed towards the eyes (pupil), causing visible reflections in the cornea (outer-most optical element of the eye). These reflections are tracked by one or more cameras 146. The underlying concept is commonly referred to as pupil center corneal reflection (PCCR). While the visible spectrum is likely to generate uncontrolled specular reflection, infrared light is not perceivable by the human eye and therefore allows for a more precise differentiation between the pupil and the iris. For example, while the infrared light directly enters the pupil, the infrared light just reflects off the iris, which is able to be captured by one or more cameras 146 and processed by the processor 132 to determine eye movements. Other methods of tracking and determining eye movement are known and may be employed for determining an eye movement of the driver as further described herein.

The image data may be received by the processor 132, which may process the image data using one or more algorithms. Any known or yet-to-be developed video and image tracking algorithms may be applied to the image data in order to recognize movements captured in the image data. Example video and image tracking algorithms include, but are not limited to, kernel-based tracking (mean-shift tracking) and contour tracking algorithms. In general, video and image tracking algorithms analyze sequential image data to determine movement between frames. In addition to tracking and determining movement the processor 132 may employ one or more object recognition algorithms to the image data to extract objects and features. Any known or yet-to-be-developed object recognition algorithms or facial recognition algorithms may be used to extract the objects and features from the image data. Example object recognition algorithms or facial recognition algorithms include, but are not limited to, scale-invariant feature transform ("SIFT"), speeded up robust features ("SURF"), and edge-detection algorithms. The object recognition algorithms or facial recognition algorithms may be stored in the non-transitory computer readable memory 134 and executed by the processor 132.

Still referring to FIG. 1, a global positioning system (GPS) 150, is coupled to the communication path 120 and communicatively coupled to the electronic control unit 130. The GPS 150 is capable of generating location information indicative of a location of the vehicle 110. The GPS signal communicated to the electronic control unit 130 via the communication path 120 may include location information comprising a National Marine Electronics Association (NMEA) message, a latitude and longitude data set, a street address, a name of a known location based on a location database, or the like. Additionally, the GPS 150 may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

The automatic turn signal initiation system 100 of FIG. 1 may further include an ignition sensor system 152 that is coupled to the communication path 120 and communicatively coupled to the electronic control unit 130. The ignition sensor system 152 generates a signal indicative of the operational state of the vehicle 110. The ignition sensor system 152 may also provide the electronic control unit 130 with identification of the key inserted in the ignition thereby identifying the driver. It should be understood that some embodiments may not include the ignition sensor system 152.

Still referring to FIG. 1, the turn signal system 154 is coupled to the communication path 120 and communicatively coupled to the processor 132. In general, a turn signal system 154 includes connection to a power source, a timing circuit or thermal flasher, a signal switch, and multiple illumination sources. A turn signal system 154 may be activated, in most vehicles, by moving a lever between positions indicative of signaling right, signaling left, and off or neutral. Activating a turn signal is a manual process in some instances. However, in embodiments of the automatic turn signal initiation system 100 an electronic or electromechanical switch may be included in the turn signal system 154 to automatically activate the turn signal system 154.

The lane departure system 156 is coupled to the communication path 120 and communicatively coupled to the processor 132. The lane departure system 156 is mechanism to warn a driver of a vehicle 110 that the vehicle 110 is moving out of a lane of travel. Lane departure systems may be passive, reactive or proactive. In a passive type system, a driver may receive a warning through a visual, audible or vibration warning that the vehicle 110 is moving out of its lane. In a reactive type system, once a vehicle 110 is departing its lane the vehicle 110 may automatically take steps to ensure the vehicle 110 returns to its lane. In a proactive type system, a driver may be warned similar to the other types and if no action by the driver is taken, the system may automatically take steps to keep the vehicle 110 in its lane. The lane departure system 156 uses one or more sensors to determine the departure or impending departure from a lane or path of travel. The one or more sensors may include video sensors, such as one or more cameras, laser sensors, infrared sensors or other guidance and optical sensors. For example, one or more cameras 146 may be mounted on the vehicle 110 to be forward facing such that sightlines in in front of the vehicle 110 may be captured. One or more cameras may also be mounted and integrated into other components of the vehicle 110 to capture image data of the road and surroundings of the vehicle 110. Similarly, laser sensors and infrared sensors may also be mounted with or independent of the video sensors.

Still referring to FIG. 1, the steering wheel grip sensor system 158 is coupled to the communication path 120 and communicatively coupled to the processor 132. The steering wheel grip sensor system 158 may comprise a plurality of sensors located in the steering wheel. The steering wheel grip sensor system 158 may provide signals to the electronic control unit 130 indicative of the location and number of hands on the steering wheel, the strength of the grip on the steering wheel, and changes in position of one or more hands on the steering wheel. The steering wheel grip sensor system 158, for example, without limitation, may include pressure sensors, inductive sensors, optical sensors, or the like. In addition to detecting the location, number, grip and change in position of one or more hands on the steering wheel, the steering wheel may also include a sensor indicating to the electronic control unit 130 the rotational angle of the steering wheel. As later described, the combination of steering wheel rotation and steering wheel grip may be driver action that is suggestive of a driver planning to change the lane of travel of a vehicle 110. It should be understood that some embodiments may not include a steering wheel grip sensor system 158.

The network interface hardware 160 is coupled to the communication path 120 and communicatively coupled to the processor 132. The network interface hardware 160 may be any device capable of transmitting and/or receiving data via a network 170. Accordingly, network interface hardware 160 can include a communication transceiver for sending and/or receiving any wired or wireless communication. For example, the network interface hardware 160 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 160 includes hardware configured to operate in accordance with the Bluetooth wireless communication protocol. In another embodiment, network interface hardware 160 may include a Bluetooth send/receive module for sending and receiving Bluetooth communications to/from a network 170. The network interface hardware 160 may also include a radio frequency identification ("RFID") reader configured to interrogate and read RFID tags.

In some embodiments, the automatic turn signal initiation system 100 may be communicatively coupled to nearby vehicles via the network 170. In some embodiments, the network 170 is a personal area network that utilizes Bluetooth technology to communicatively couple the automatic turn signal initiation system 100 and the nearby vehicles. In other embodiments, the network 170 may include one or more computer networks (e.g., a personal area network, a local area network, or a wide area network), cellular networks, satellite networks and/or a global positioning system and combinations thereof. Accordingly, the automatic turn signal initiation system 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Figure 4:
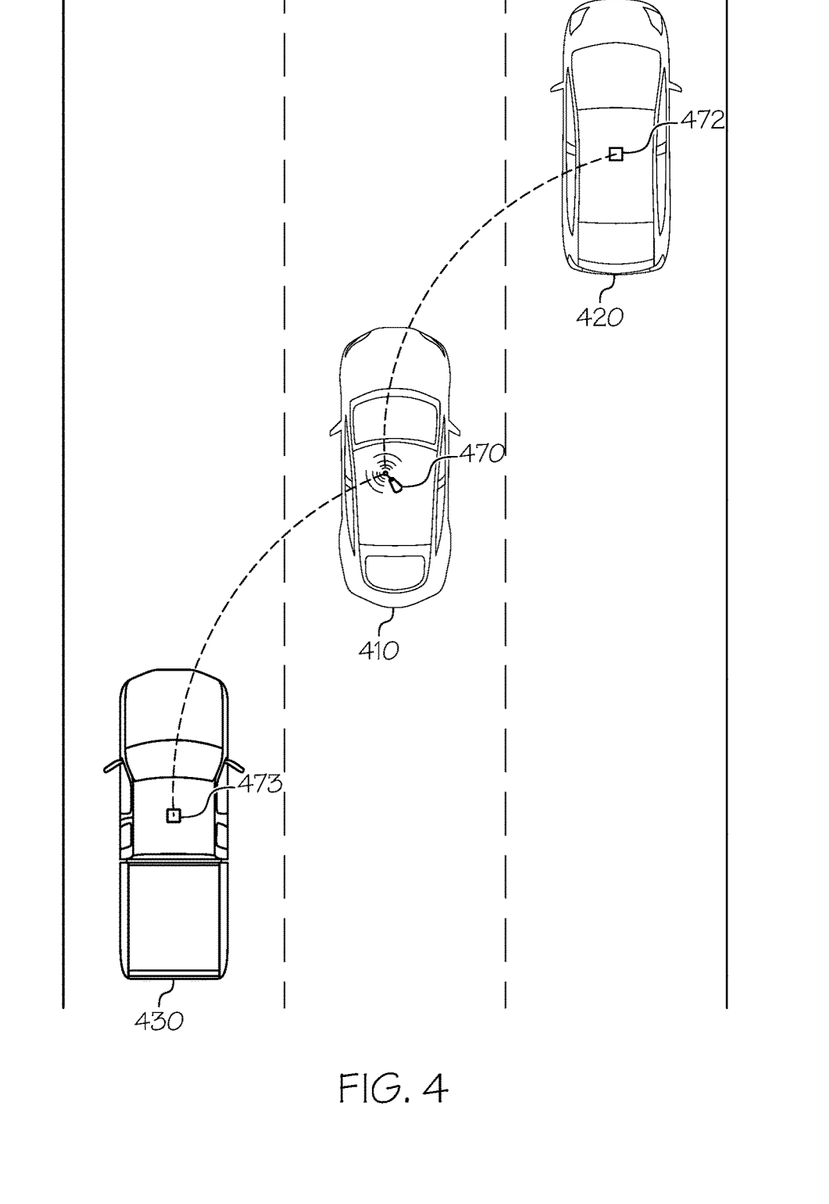
FIG. 4 is a view illustrating inter-vehicle communication according to one or more embodiments shown and described herein.

Still referring to FIG. 1, as stated above, the network 170 may be utilized to communicatively couple the automatic turn signal initiation system 100 with the nearby vehicles 420, 430 as shown and further described with respect to FIG. 4. The nearby vehicles may include network interface hardware 160 and an electronic control unit 130 having a processor 132 and non-transitory computer readable memory 134 capable of being communicatively coupled with the automatic turn signal initiation system 100. A processor 132 of the nearby vehicles may execute a machine-readable instruction set stored in the non-transitory computer readable memory 134 to communicate with the automatic turn signal initiation system 100.

The following sections will now describe embodiments of the operation of the automatic turn signal initiation system 100 for automatically activating a turn signal based on a lane change event and driver action. In some embodiments of the automatic turn signal initiation system 100, the system comprises an electronic control unit 130 having a processor 132 and a non-transitory computer readable memory 134, one or more cameras 146 and turn signal system 154 communicatively coupled to the electronic control unit 130. In some embodiments, the automatic turn signal initiation system 100 includes additional sensors and systems as described herein.

Figure 2:
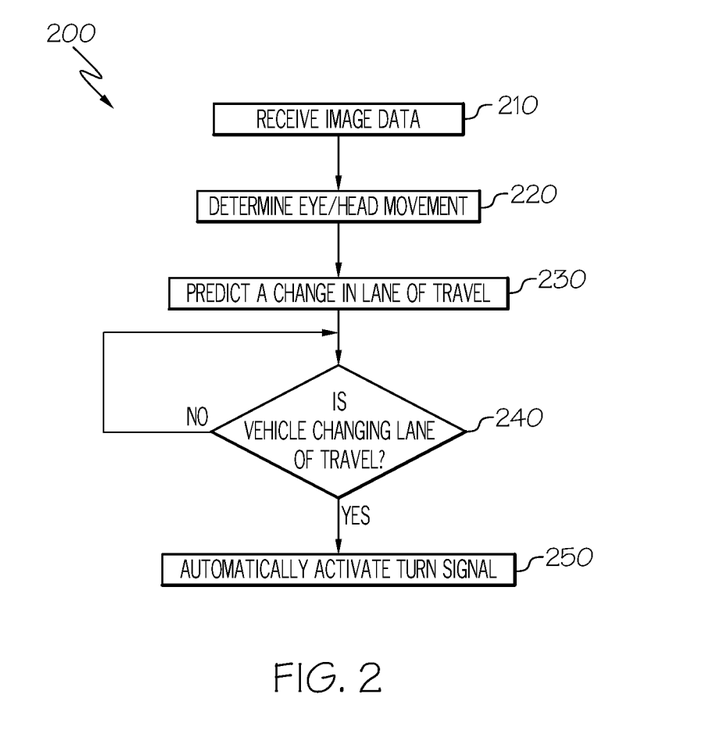
FIG. 2 is a flowchart depicting a method of automatically activating a turn signal according to one or more embodiments shown and described herein.

Referring now to FIG. 2, a flowchart 200 of an example embodiment of a method for an automatic turn signal initiation system 100 for automatically activating a turn signal based on a lane change event and driver action is depicted. The flowchart 200 depicted in FIG. 2 is a representation of a machine-readable instruction set stored in the non-transitory computer readable memory 134 and executed by the processor 132 of the electronic control unit 130. The process of the flowchart 200 in FIG. 2 may be executed at various times and in response to signals from the sensors communicatively coupled to the electronic control unit 130.

In step 210, the electronic control unit 130 receives image data from camera 146. The one or more cameras 146 may be positioned to track eye movement, head movement or both. In some embodiments, one or more cameras 146 may be an infrared camera in operation with an infrared light emitter 148 for capturing eye movement of the driver.

Once the electronic control unit 130 receives image data from the one or more cameras 146, the electronic control unit 130 determines eye movement, head movement or both at step 220. As discussed above, the electronic control unit 130 may employ various algorithms for determining movement within image data. As used herein, rotation of the head generally means the head moves left or right such that the chin move towards or away from a shoulder. In some embodiments, rotation of the head by about 5 degrees may be determined by the electronic control unit 130. In other embodiments, rotation of the head by about 10 degrees, about 15 degrees, about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees or about 90 degrees left or right is determined by the electronic control unit 130. Similarly, eye movement may be determined with or independently of head movement. Eye tracking algorithms may characterize eye movement based on inferior, superior, and lateral movements. As used herein, inferior eye movements describe downward movements, superior describe upward movements and lateral movements also described as duction with adduction referring to an eye movement toward the nose (nasal) and abduction referring to an eye movement away from the nose (temporal). Eye tracking may be accomplished by focusing on a signal eye, both eyes or a combination of both eyes depending on the position of the head with respect to the one or more cameras 146.

Although a driver may not manually activate a signal prior to making a lane change, drivers typically, for example without limitation, check side mirrors by moving their eyes and/or head to view the side mirrors, check a blind spot by looking left and/or right out a vehicle window, check a rear view mirror by looking upward, or even looking at the dash for a blind spot warning indicator, side facing camera warning or the like prior to executing a lane change or a turn. These actions or others may be predictive of a plan to change the lane of travel. As used herein, lane of travel may refer to a physical lane of travel on a road demarked by lane markers or generally refer to a consistent direction of travel. By capturing eye and head movement with the one or more cameras 146 and analyzing the image data with the electronic control unit 130 a prediction, in step 230, may be made as to whether a change in the lane of travel from a current lane of travel to a predicted destination lane of travel based on either or both the eye movement and the head movement determined by the electronic control unit 130. The prediction may be based on a predefined set of eye movements, head movements or combinations thereof stored in the non-transitory computer readable memory 134. For example, without out limitation, when eye and/or head movement indicative of a view in the direction of the left mounted side mirror is determined from the image data then the automatic turn signal initiation system 100 may predict that a turn or change in lane to the left is about to occur.

Once a change of lane is predicted in step 230, the electronic control unit 130 monitors the vehicle positional status in step 240. The determination that a vehicle 110 is changing the lane of travel may depend on one or more lane change events. In some embodiments, the vehicle 110 is equipped with a lane departure system 156 that may provide a signal to the electronic control unit 130 that the vehicle 110 is departing the current lane of travel. In other embodiments, the vehicle 110 is equipped with a GPS 150 that provides vehicle position data to the electronic control unit 130. In yet other embodiments, a steering wheel is equipped with a rotational sensor that can determine when a steering wheel is rotated indicating a change in the lane of travel. In yet further embodiments, other sensors and systems may be communicatively coupled to the electronic control unit 130 providing or validating the change in the lane of travel of the vehicle 110. For example, a GPS 150 may validate that rotation detected by a steering wheel is inconsistent with the current direction of a lane or road thereby confirming the rotation of the steering wheel is indicative of a vehicle 110 changing the lane of travel.

Once a prediction that a change in lane of travel will occur and a change of lane is detected, the automatic turn signal initiation system 100 activates the turn signal in step 250. The activation of the turn signal system 154 may be accomplished by the electronic control unit 130 signaling an electronic switch or electromechanical switch to activate the turn signal indicator corresponding to the direction toward the predicted destination lane of travel. Although a lane change may already be underway, a driver of a nearby vehicle may perceive the activated turn signal before perceiving the movement of the vehicle 110.

Figure 3:
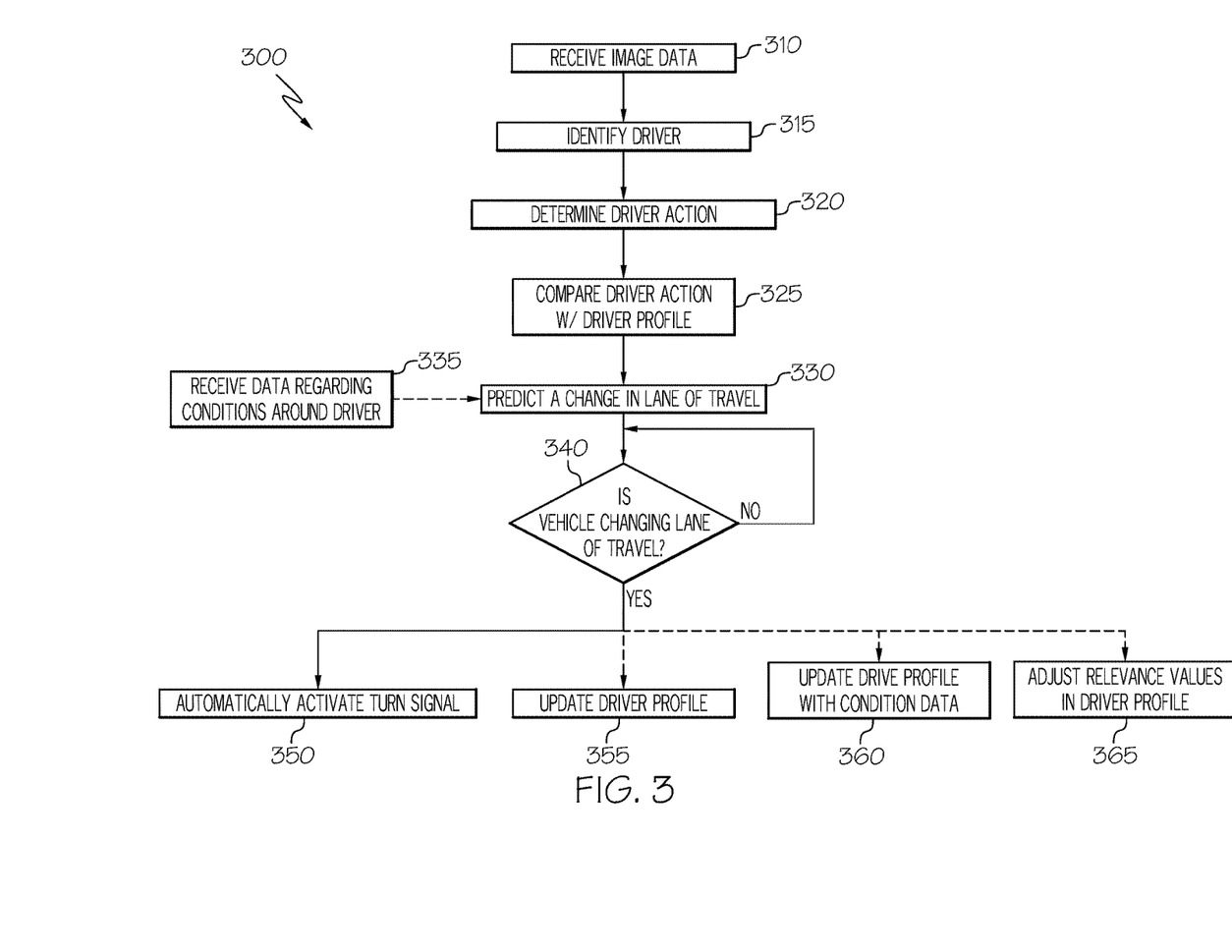
FIG. 3 is a flowchart depicting another method of automatically activating a turn signal according to one or more embodiments shown and described herein.

In another example embodiment of the automatic turn signal initiation system 100, the automatic turn signal initiation system 100 may determine other driver actions besides eye movement and head movement and the surroundings of the driver and the vehicle 110 to improve the prediction of a change in the lane of travel and build a driver profile to compare against future determined actions. Referring now to FIG. 3, a flowchart 300 of an example embodiment of a method for an automatic turn signal initiation system 100 for automatically activating a turn signal based on a lane change event and driver action is depicted. The flowchart 300 depicted in FIG. 3 is a representation of a machine-readable instruction set stored in the non-transitory computer readable memory 134 and executed by the processor 132 of the electronic control unit 130. The process of the flowchart 300 in FIG. 3 may be executed at various times and in response to signals from the sensors communicatively coupled to the electronic control unit 130.

In step 310, the electronic control unit 130 receives image data from camera 146. The one or more cameras 146 may be positioned to capture image data of a number of driver actions. The one or more cameras 146 may also capture an image of the face of a driver to identify the driver. Driver actions captured by the one or more cameras 146 may include, but are not limited to, eye movement, head movement, shoulder movement, torso movement, grip position of the steering wheel and the like. Additionally, the one or more cameras 146 may operate as an occupant sensor 138 for determining the presence of other occupants in the vehicle 110. In embodiments described herein, one or more cameras 146 may provide image data to the electronic control unit 130 from various viewpoints within and around the vehicle 110.

Once the electronic control unit 130 receives image data from the one or more cameras 146, the electronic control unit 130, in step 315, determines the identity of the driver and in step 320 determines a driver action. While the flowchart 300 depicts step 315 before step 320, embodiments are not limited to the example order depicted in the flowchart 300. Step 315 and step 320 may be carried out simultaneously or in any order. Additionally, step 315, identifying the driver, may not be based on image data received during step 310, therefore step 315 may be performed by the processor 132 before or after the electronic control unit 130 receives image data in step 310.

Determining the identity of the driver, in step 315, may be based on, for example, without limitation, an ignition sensor system 152 detecting a key unique to a driver used to access or start the vehicle 110, a portable device paired with the vehicle 110, a voice print from a microphone 144, or by a variety other identification detection systems for vehicles. The identification of the driver allows the automatic turn signal initiation system 100 to recall or create a profile specific to the driver. The driver profile for purposes of the automatic turn signal initiation system 100 comprises a characterization of driver actions leading up to and during the changing of a lane of travel. In some embodiments, the driver profile may include one or more elements that make up a more complex driver action that are indicative of a driver planning to change the lane of travel. The elements may include for example, without limitation, a duration of time the element occurs, a degree of rotation, or other quantifiable valuations to further refine the element and the driver action. For example, a driver action of looking left may be characterized into elements such as degrees of head rotation, degrees of shoulder rotation, and a change in weight displacement in a vehicle seat. By detecting a plurality of elements with various types of sensors, including but not limited to a camera 146, microphone 144, occupant sensor 138 and the like, data can be generated to define a driver action into refined elements to build and update a driver profile.

For example, if step 320 determines that a driver turned their eyes, head and shoulders to view a blind spot on the left or right side of a vehicle 110, in total a driver action of looking left or right, from the image data received in step 310 then the driver action is compared to the driver profile in step 325. In a more particular example, step 320 may characterize a shoulder turn to the right to be between about 0 degrees and less than about 5 degrees, which when compared to the driver profile in step 325 may or may not be indicative of a driver planning to make a change in the lane of travel. If the shoulder turn and optionally other elements of the driver action determined in step 320 matches with a driver action defined in the driver profile during step 325, then step 330 may predict that the driver is planning to make a change in the lane of travel.

In some embodiments, a single driver action may not be sufficient to accurately predict a driver planning to make a change in the lane of travel. In other embodiments, a series of driver actions or a combination of driver actions may be more predictive of driver planning to make a change in the lane of travel. For example, without limitation, a driver profile may indicate that a driver who turns their shoulders about 10 degrees to about 15 degrees to the left, their head about 75 degrees to 80 degrees in the same direction as the shoulders while their eyes also look left is more likely than not to be planning a change in the lane of travel to the left. Therefore, if a driver action determined in step 320 is determined to be comparatively similar to that driver profile in step 325, then step 330 predicts that the vehicle 110 is about to change in the lane of travel.

In other embodiments, for example, a driver may pause their conversation before changing a lane of travel, which may be determined through a microphone 144 in the vehicle 110. In some embodiments, the duration of eye movement, head movement, shoulder movement, torso movement or the like may also be included in determining whether the driver action is predictive of a driver planning to change the lane of travel.

In some embodiments, predicting a change in the lane of travel may also include characterization of other conditions present at the time the driver changed lanes. In step 335, data regarding conditions around the driver may be determined and provided to the prediction analysis in step 330. Conditions around the driver may include, without limitation, traffic conditions, weather conditions, time of day, location, duration of current travel, status of hands-free calling link, noise level, status of navigation system, number of occupants in the vehicle 110, status of occupants and the like. The conditions around the driver may affect the driver action linked to manually activating or not activating a turn signal. For example, if a driver is driving on a rural road with no cars in sight, then the driver may be less likely to activate the turn signal than if the driver was in an urban setting.

Additionally, if a driver is distracted by occupants in the vehicle 110 or paying close attention to directions from a navigation system while in traffic the driver may neglect activating a turn signal. As a result, step 330 may optionally receive data regarding conditions around the driver from step 335 to predict a change in the lane of travel in step 330.

Once a change of lane is predicted in step 330, the electronic control unit 130 monitors the vehicle positional status in step 340. The determination that a vehicle 110 is changing the lane of travel may depend on one or more lane change events as described above. Once a change of lane is detected in step 340, the automatic turn signal initiation system 100 activates the turn signal in step 350. The activation of the turn signal system 154 may be accomplished by the electronic control unit 130 signaling an electronic switch or electromechanical switch to activate the turn signal indicator corresponding to the predicted destination lane of travel. Although a lane change may already be underway, a driver of a nearby vehicle may perceive the activated turn signal before perceiving the movement of the vehicle 110.

In some embodiments, the electronic control unit 130 also updates the driver profile, in step 355, with the driver actions detected during the previous iteration that resulted in automatic activation of the turn signal system 154. The update may further refine an element of a driver action that was already defined in the driver profile or may include a new driver action in the driver profile. In further embodiments, in step 360, the driver profile is updated to include a condition detected around the driver or include a new condition detected during the previous iteration that resulted in automatic activation of the turn signal system 154. Finally, the electronic control unit 130 may evaluate and adjust the relevance values in the driver profile. A relevance value may be assigned to each element of the driver profile and optionally define the significance of that element to predicting a change in lane of travel. For example, when turning right a driver more often preforms a driver action to check their blind spot than checking their rear view mirror. Therefore, if the elements of a driver action to check their blind spot occurs then the associated elements may be more relevant in predicting a change in the lane of travel than the elements associated with looking in the rear view mirror. In a further example, without limitation, if a driver consistently or more often than not just uses their eyes to glance in the mirrors rather than turning their head to more directly look at the mirrors, then head movement may receive a lower relevancy value than eye movement when determining a driver action indicative of a driver planning to change the lane of travel.

In some embodiments, steps 355, 360 and 365, of the automatic turn signal initiation system 100 use previous iterations of a driver failing to manually activate a turn signal to improve the prediction algorithm of step 330. For example, if a driver time after time puts both hands on the wheel prior to making a turn, then the steering wheel grip sensor data would be adjusted to be more relevant and the act of putting both hands on the wheel would be added or updated in the driver profile. Similarly, if a driver is determined to exhibit certain driver actions prior to failing to activate a turn signal when determined to be close to home based on GPS location data then step 365 may adjust the relevancy of the elements of a driver action based on distance from a home location. Numerous combinations of driver actions and conditions surrounding the driver disclosed herein may be determined and characterized to define a driver profile. Additionally, numerous driver actions and conditions surrounding the driver not stated herein may also be implemented to predict whether a driver is planning to make a change in the lane of travel. As a result, if driver actions are determined to be predicative of a driver planning to make a change in the lane of travel by one vehicle 110 with an automatic turn signal initiation system 100, then the driver actions may be communicated and shared with an automatic turn signal initiation system 100 of another vehicle using network interface hardware 160 to communicate of a network 170. Likewise, updates to the automatic turn signal initiation system 100 may also be received through the network interface hardware 160 from the network 170.

Referring now to FIG. 4, a view illustrating inter-vehicle communication is depicted. In some embodiments, vehicles 410, 420 and 430 may interconnect over a network via network interface hardware 470, 472, 473 for communicating a plurality of information including, but not limited to, whether a target vehicle 410 has been predicted to change lanes without signaling, updates to the automatic turn signal initiation system 100 and the like. In some embodiments, prior to activating a turn signal in a target vehicle 410 the nearby vehicles 420, 430 may receive a warning message that the target vehicle 410 may soon change lanes without adequately signaling beforehand. Additionally, in other embodiments, automatic turn signal initiation systems with a limited amount of driver profile data may update or supplement relevancy values and elements of a driver action from the nearby vehicles having larger quantities of elements or refined driver profiles via the inter-vehicle communication.

Figure 5A:
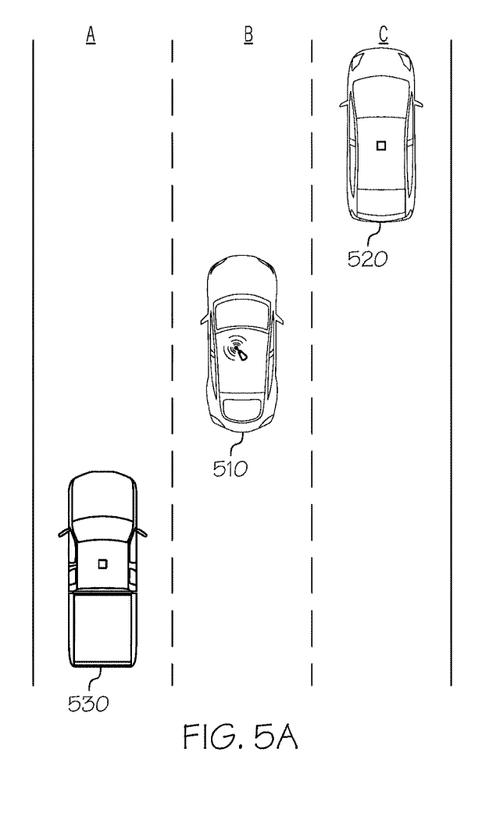
FIG. 5A is a first view of a step-by-step lane change of a vehicle implementing the automatic turn signal initiation system and method according to one or more embodiments shown and described herein.
Figure 5B:
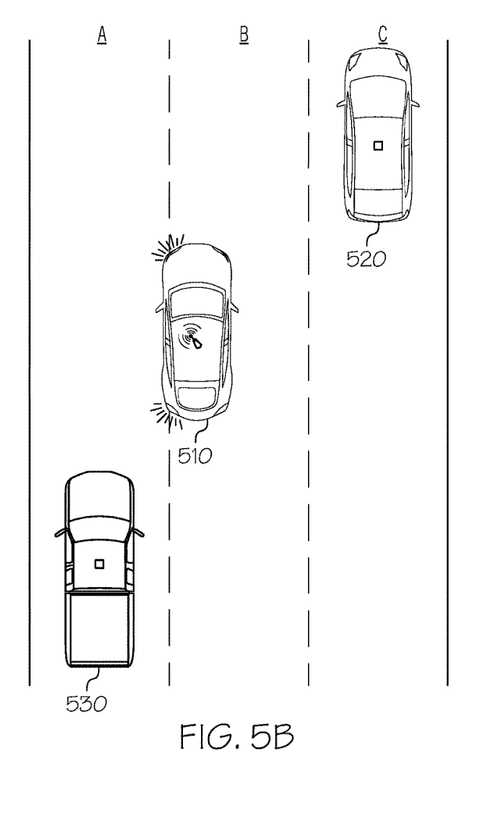
FIG. 5B is a second view of a step-by-step lane change of a vehicle implementing the automatic turn signal initiation system and method according to one or more embodiments shown and described herein.

Referring now to FIGS. 5A to 5D, a series of views depicting a step-by-step lane change of a target vehicle 510 implementing an automatic turn signal initiation system 100 and method is shown. Viewing FIGS. 5A to 5D in order starting with FIG. 5A and ending with 5D, target vehicle 510 changes lane from lane B to lane A. For example, without limitation, FIG. 5A depicts target vehicle 510 prior to any change in the lane of travel movement. The automatic turn signal initiation system 100 monitors the driver for any driver action that would be predicative of a change in the lane of travel. Should a driver action that is predicative of a change in the lane of travel be detected the automatic turn signal initiation system 100 begins to monitor for motion toward the predicted destination lane of travel. In FIG. 5B, the motion toward lane A, the predicted destination lane of travel, is detected, therefore, the automatic turn signal initiation system 100 automatically activates the left turn signal. Although the turn signal was not active before the target vehicle 510 reached the lane markers defining lane A from lane B, the activation of the turn signal may still provide the driver of the nearby vehicle 530 sufficient notice to perceive a change of lane by the target vehicle 510. Additionally, the driver of the nearby vehicle 530 may also be able to distinguish the movement, now perceived as a result of seeing the turn signal, as a more than likely intent of the target vehicle 510 to enter lane A. Furthermore, the driver of the nearby vehicle 530 may more adequately respond to a vehicle that is changing lanes versus a vehicle perceived to be drifting with the questionable intent of entering lane A.

Figure 5C:
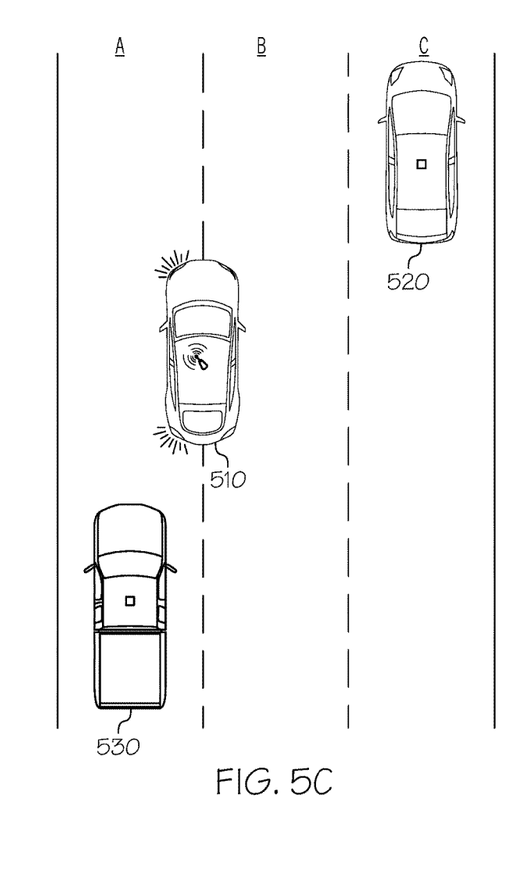
FIG. 5C is a third view of a step-by-step lane change of a vehicle implementing the automatic turn signal initiation system and method according to one or more embodiments shown and described herein.

In FIG. 5C, the target vehicle 510 continues to merge into lane A with the turn signal activated. During the merge, the driver of the target vehicle 510 may receive an auditory, visual or vibration notification indicating they forgot to activate their turn signal before changing the lane of travel. Once in the new lane of travel, lane A, as depicted in FIG.

Figure 5D:
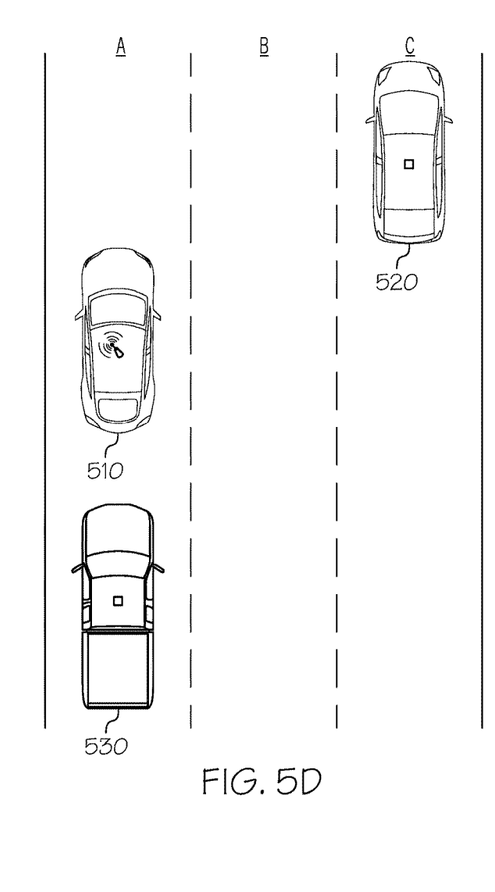
FIG. 5D is a fourth view of a step-by-step lane change of a vehicle implementing the automatic turn signal initiation system and method according to one or more embodiments shown and described herein.

5D the turn signal may be deactivated automatically or manually. Additionally, as described above with reference to FIG. 4 the nearby vehicles 520, 530 may receive a notification over an inter-vehicle communication system from the automatic turn signal initiation system 100 of the target vehicle 510 that the target vehicle 510 may change lanes without sufficiently signaling before merging.

It should now be understood that embodiments described herein are directed to automatic turn signal initiation systems that receive image data from a camera, determine a driver action based on the image data, predict a change in the lane of travel of a vehicle to a predicted destination lane of travel based on the driver action, detect initiation of the change from the current lane of travel to the predicted destination lane of travel and automatically activate the turn signal in response. The automatic turn signal initiation system comprises at least a controller enabled to receive image data from one or more cameras, a turn signal system and an electronic control unit having a processor and non-transitory computer readable memory. The automatic turn signal initiation system may optionally receive to the electronic control unit various signals from sensors in the vehicle and on the vehicle to more completely determine a driver action and conditions around the driver and vehicle to predict whether a driver is planning to change the lane of travel of a vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. An auto turn signal system for activating a turn signal of a vehicle, the auto turn signal system comprising:
   an electronic control unit comprising a processor and a non-transitory computer readable memory;
   one or more cameras communicatively coupled to the electronic control unit, wherein the one or more cameras automatically captures image data and transmits the image data to the electronic control unit;
   a driver profile, stored in the non-transitory computer readable memory, comprising a characterization of at least one of a driver head movement and a driver eye movement as indicative of a driver planning to make a change in a lane of travel; and
   a machine-readable instruction set stored in the non-transitory computer readable memory that causes the auto turn signal system to perform at least the following when executed by the processor:
      receive the image data from the one or more cameras;
      determine at least one of the driver head movement and the driver eye movement based on the image data;
      compare at least one of the driver head movement and the driver eye movement determined from the image data to at least one of the driver head movement and the driver eye movement of the driver profile;
      predict a change in the lane of travel from a current lane of travel to a predicted destination lane of travel based on the comparison;
      detect initiation of the change from the current lane of travel to the predicted destination lane of travel;
      automatically activate the turn signal in response to detecting the initiation of the change from the current lane of travel to the predicted destination lane of travel; and
      update the driver profile, in response to automatic activation of the turn signal, such that the characterization of at least one of the driver head movement and at least one of the driver eye movement in the driver profile is refined based on at least one of the driver head movement and the driver eye movement determined from the image data.

2. The auto turn signal system of claim 1, further comprising a near-infrared light emitter focusing near-infrared light onto one or more eyes of the driver, wherein the one or more cameras includes an infrared camera positioned to capture the near-infrared light reflected from the one or more eyes of the driver.

3. The auto turn signal system of claim 1, wherein the machine-readable instruction set further causes the processor to:
   identify the driver of the vehicle;
   create the driver profile for an identified driver when the driver profile for the identified driver does not exists in the non-transitory computer readable memory; and
   recall the driver profile for the identified driver when the driver profile for the identified driver exists in the non-transitory computer readable memory.

4. The auto turn signal system of claim 1, further comprising one or more environment sensors coupled to the electronic control unit, wherein the one or more environment sensors generate one or more signals indicative of one or more conditions around the driver, and wherein the machine-readable instruction set further causes the processor to:
   receive the one or more signals indicative of the one or more conditions around the driver; and
   update the driver profile with the one or more conditions around the driver leading up to the driver initiating the change from the current lane of travel to the predicted destination lane of travel when the driver failed to manually activate the turn signal.

5. The auto turn signal system of claim 1, wherein the machine-readable instruction set further causes the processor to:
   adjust a relevance value of an element of the driver profile such that the auto turn signal system is more or less sensitive to the element of the driver profile when predicting the change in the lane of travel from the current lane of travel to the predicted destination lane of travel based on at least one of the driver head movement and the driver eye movement.

6. The auto turn signal system of claim 1, further comprising a lane departure system communicatively coupled to the electronic control unit, wherein the lane departure system comprises a forward looking camera capturing image data from in front of the vehicle for determining the lane of travel and the lane departure system provides one or more signals to the electronic control unit indicative of a position of the vehicle relative to the lane of travel.

7. The auto turn signal system of claim 6, wherein the lane departure system comprises one or more cameras for detecting a lane marking and determining when the vehicle travels over the lane marking.

8. An auto turn signal system for activating a turn signal of a vehicle, the auto turn signal system comprising:
- an electronic control unit comprising a processor and a non-transitory computer readable memory;
- one or more cameras communicatively coupled to the electronic control unit, wherein the one or more cameras automatically captures image data and transmits the image data to the electronic control unit;
- a driver profile, stored in the non-transitory computer readable memory, comprising one or more elements corresponding to a characterization of one or more driver actions indicative of a driver planning to make a change in a lane of travel; and
- a machine-readable instruction set stored in the non-transitory computer readable memory that causes the auto turn signal system to perform at least the following when executed by the processor:
  - receive the image data from the one or more cameras;
  - identify the driver of the vehicle;
  - determine the one or more driver actions based on the image data;
  - compare the one or more driver actions determined from the image data with the one or more elements of the driver profile corresponding to an identity of the driver of the vehicle;
  - predict a change in the lane of travel from a current lane of travel to a predicted destination lane of travel based on the comparison of the one or more driver actions determined from the image data with the one or more elements of the driver profile;
  - detect initiation of the change from the current lane of travel to the predicted destination lane of travel;
  - automatically activate the turn signal in response to detecting the initiation of the change from the current lane of travel to the predicted destination lane of travel; and
  - update the one or more elements of the driver profile, in response to the automatic activation of the turn signal, such that the characterization of the one or more driver actions in the driver profile is refined based on the one or more driver actions determined from the image data.

9. The auto turn signal system of claim 8, further comprising a near-infrared light emitter focusing near-infrared light onto one or more eyes of the driver, wherein the one or more cameras includes an infrared camera positioned to capture the near-infrared light reflected from the one or more eyes of the driver.

10. The auto turn signal system of claim 8, further comprising one or more environment sensors coupled to the electronic control unit, wherein the one or more environment sensors generate one or more signals indicative of one or more conditions around the driver and the machine-readable instruction set further causes the processor to:
- receive the one or more signals indicative of the one or more conditions around the driver; and
- update the driver profile with the one or more conditions around the driver leading up to the driver initiating the change from the current lane of travel to the predicted destination lane of travel when the driver failed to manually activate the turn signal.

11. The auto turn signal system of claim 10, wherein the one or more conditions around the driver comprises at least one of:
- traffic conditions;
- weather conditions;
- time of day;
- location;
- duration of current travel;
- status of hands-free calling link;
- noise level;
- status of navigation system;
- number of occupants in the vehicle; and
- status of occupants.

12. The auto turn signal system of claim 8, wherein the one or more driver actions comprises at least one of:
- eye movement;
- head movement;
- shoulder movement;
- torso movement;
- change in grip on a steering wheel;
- change in weight distribution in a driver seat; and
- pause in conversation.

13. The auto turn signal system of claim 8, wherein the machine-readable instruction set further causes the processor to:
- adjust one or more relevance values of the one or more elements of the driver profile such that the auto turn signal system is more or less sensitive to the one or more elements of the driver profile when predicting the change in the lane of travel from the current lane of travel to the predicted destination lane of travel based on the one or more driver actions.

14. A method for automatically activing a turn signal of a vehicle, the method comprising:
- receiving image data from one or more cameras;
- retrieving, from a non-transitory computer readable memory, a driver profile comprising a characterization of at least one of a driver head movement and a driver eye movement as indicative of a driver planning to make a change in a lane of travel;
- determining at least one of the driver head movement and the driver eye movement based on the image data;
- comparing the at least one of the driver head movement and the driver eye movement determined from the image data to the at least one of the driver head movement and the driver eye movement of the driver profile;
- predicting a change in the lane of travel from a current lane of travel to a predicted destination lane of travel based on the comparison;
- detecting initiation of the change from the current lane of travel to the predicted destination lane of travel;
- activating the turn signal in response to detecting the initiation of the change from the current lane of travel to the predicted destination lane of travel is detected; and
- updating, in response to the automatic activation of the turn signal, the driver profile such that the characterization of the at least one of the driver head movement and the at least one of the driver eye movement in the driver profile is refined based on at least one of the driver head movement and the driver eye movement determined from the image data.

15. The method of claim 14, further comprising:
- identifying the driver of the vehicle;

creating the driver profile for the driver when the driver profile for the driver does not exists in the non-transitory computer readable memory; and selecting the driver profile for the driver when the driver profile for the driver exists in the non-transitory computer readable memory.

16. The method of claim 14, further comprising:

receiving, from one or more environment sensors, one or more signals indicative of one or more conditions around the driver; and updating the driver profile with the one or more conditions around the driver leading up to the driver initiating the change from the current lane of travel to the predicted destination lane of travel when the driver failed to manually activate the turn signal.

17. The method of claim 14, further comprising:

adjusting one or more relevance values of one or more elements of the driver profile such that the method for automatically activing the turn signal of the vehicle is more or less sensitive to the one or more elements of the driver profile when predicting the change in the lane of travel from the current lane of travel to the predicted destination lane of travel based on at least one of the driver head movement and the driver eye movement.

* * * * *